United States Patent
Schroder

[11] 3,760,605
[45] Sept. 25, 1973

[54] TOOTHED DISK COUPLING OF A SHAFT TO A HUB

[75] Inventor: Walter Schroder, Stemmannsfeld, Germany

[73] Assignee: WGW Westdeutsche Getriebewerke GmbH, Herne, Germany

[22] Filed: Apr. 17, 1972

[21] Appl. No.: 244,814

[30] Foreign Application Priority Data
Apr. 21, 1971  Germany.................. P 21 19 325.9

[52] U.S. Cl. ...................... 64/9, 64/14, 64/27 NM, 287/53 SS
[51] Int. Cl. ............................................ F16d 3/18
[58] Field of Search ...................... 64/9, 14, 6, 4, 5, 64/23, 27 NM; 287/53 SS, 53 R

[56] References Cited
UNITED STATES PATENTS

| | | | |
|---|---|---|---|
| 1,759,338 | 5/1930 | Allen | 64/9 |
| 2,529,963 | 11/1950 | Prodromos | 287/53 R |
| 2,679,735 | 6/1954 | Rowe | 64/9 |
| 2,956,826 | 10/1960 | Nord | 287/53 R |
| 3,314,318 | 4/1967 | Shoults | 64/9 |

Primary Examiner—Charles J. Myhre
Assistant Examiner—Randall Heald
Attorney—Ralph D. Dinklage et al.

[57] ABSTRACT

In a positive releasable coupling comprising a shaft, a hub on said shaft, the shaft and hub having end faces lying in substantially the same plane and being provided with aligned slots cut into their end faces, a coupling disk provided with teeth complementing and engaging the slots of said shaft and said hub and thereby coupling said shaft to said hub, and means for securing said disk to at least one of said shaft and said hub, the improvement which comprises forming said disk as an annulus held against the ends of the shaft and hub by a cap secured to the shaft by a bolt. The disk is provided with radially directed wedge shaped teeth, the faces of the teeth in radial cross-section making about 45° angles with the plane defining the ends of the shaft and hub with the apex being located in the vicinity of the outside surface of the shaft; in cross-section tangenial to the shaft the teeth are tapered toward the shaft. The ends of the shaft and hub are slotted so as to mate with the teeth of the disk and are thereby coupled. Advantageously the disk is deformable between the teeth and is provided on its face adjacent the cap with spaced projections which constitute the points of contact therebetween.

8 Claims, 4 Drawing Figures

TOOTHED DISK COUPLING OF A SHAFT TO A HUB

The invention relates to a positive, releasable coupling for the transmission of heavy torque between a solid shaft and a hub or hollow shaft.

To provide a coupling for rotation between a shaft and a hub or hollow shaft mounted thereon, springs are used in many cases where small diameters are involved. Where the hub is of larger diameter, such as a diameter in excess of 150 mm, friction-type coupling means are usually used, such as clamping elements, clamping sets or the like. These friction-type coupling are in many cases disposed on the solid shaft within the hub. Such friction coupling means have the disadvantage that their internally located elements necessitate the recessing and hence the weakening of the solid shaft; furthermore, access to them can be obtained from without only with difficulty. Since experience shows that friction junctions corrode in the course of time, along with the clamping elements, especially in the case of outdoor use, disassembly of the hub or hollow shaft, i.e., the removal of the hub from the shaft, becomes difficult or even impossible. The result may be that the hub will have to be forced off. Another disadvantage is that, with friction coupling means, slipping under high torque peaks cannot reliably be prevented.

Positive couplings are known in which special coupling elements join the shaft and hub together by means of teeth. In one known coupling of this kind, the ends of both the shaft and hub are provided with slots which are engaged by the teeth of a disk. The disk is fastened to the end of the shaft by means of a bolt.

While such coupling is satisfactory for some purposes, it is an object of the invention to provide a positive coupling which is even more reliable in transmitting heavy torques.

This and other objects and advantages are realized in accordance with the present invention which relates to a coupling of the type described comprising a shaft, a hub on said shaft, the shaft and hub having end faces lying in substantially the same plane and being provided with aligned slots cut into their end faces, a coupling disk provided with teeth complementing and engaging the slots of said shaft and said hub and thereby coupling said shaft to said hub, and means for securing said disk to at least one of said shaft and said hub. The novel feature resides in forming the teeth of the disk so that they are generally radially directed, said teeth in radial cross-section being wedge-shaped, the apex of the wedge pointing toward said shaft and said hub and being located in the vicinity of the outside surface of said shaft. As a result of the wedge-shaped construction of the teeth, the bearing surface of each tooth is considerably increased without weakening the cross section of the shaft or hub, unlike axis-parallel or axis-perpendicular arrangements.

At the same time the teeth are given an especially high strength by their shape, which is especially important where the transfer of great forces is involved. Furthermore, the slots can be milled into the ends of the shaft and hub or hollow shaft at not great expense.

Advantageously the coupling element is an annular disk which is fastened by means of a cap or retaining means to the ends of the shaft and hub or hollow shaft. Advantageously, the heavily stressed coupling element can thus be manufactured separately without being made of high-quality and expensive materials, being made, for example, in the form of a precision casting. A seal can be provided in the cap so as to protect the interior of the coupling.

It is desirable for the wedge angle of the grooves and teeth to be approximately 45°, i.e. for the inclined faces of the wedge in radial cross-section to make 45° angles with the plane in which the end faces of the shaft and hub lie. High axial stresses occur, which cause a resilient deformation of the coupling element in the axial direction and which thus enable the tooth surfaces to conform better to their matching recesses in the shaft and hub which is of great advantage where high torques are to be transmitted. Advantageously, the portions of the disk between the individual teeth are deformable, which even further enhances the ability of the teeth of the coupling element to conform to their seats. The coupling element is advantageously made to contact the cap or retainer at only a few points to which end the surface of the coupling element facing the cap or retainer is provided with spaced, slightly superelevated projections; by this configuration the teeth, in their resilient deformation, are urged into the slots primarily in the superelevated areas, which by and large increases the contact area of the coupling element which is available for the transfer of torque.

The deformation forces acting on the coupling element can be greatly aided by providing the slots and teeth with sloping flanks, i.e. the teeth in cross-section tangential to the shaft are tapered toward said shaft. Such a profile also facilitates the removal of the coupling element.

The invention will now be further described with reference to the accompanying drawings wherein.

Figure 1:
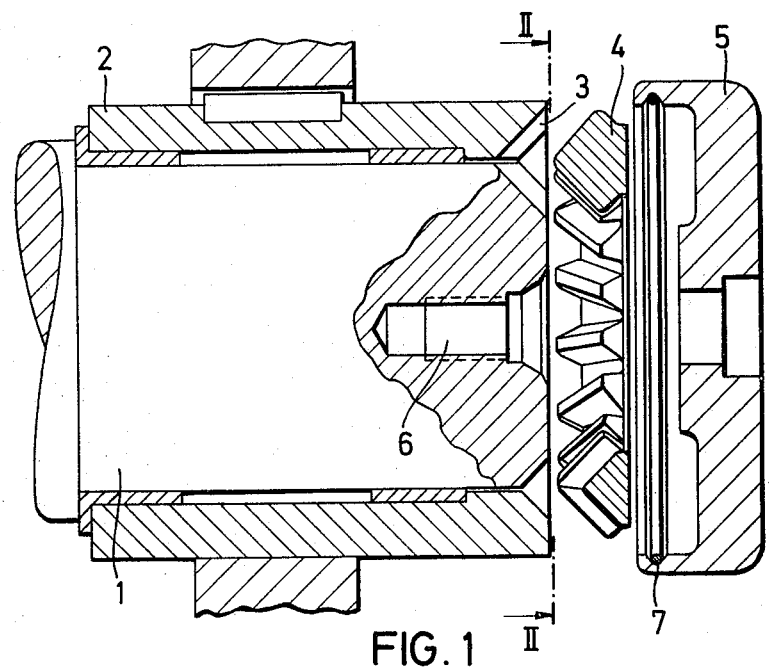
FIG. 1 is a longitudinal cross section of one coupling embodiment in accordance with the invention.
Figure 2:
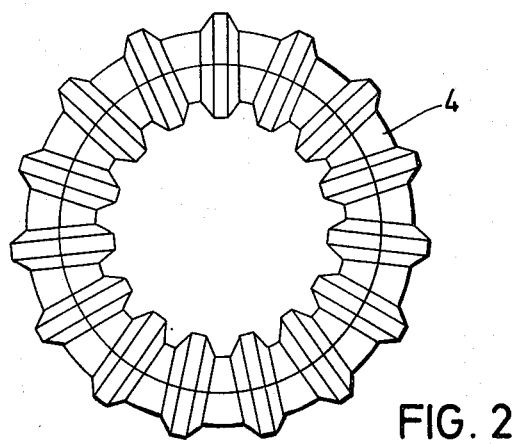
FIG. 2 is an elevational view of the coupling element taken along line II—II of FIG. 1.
Figure 3:
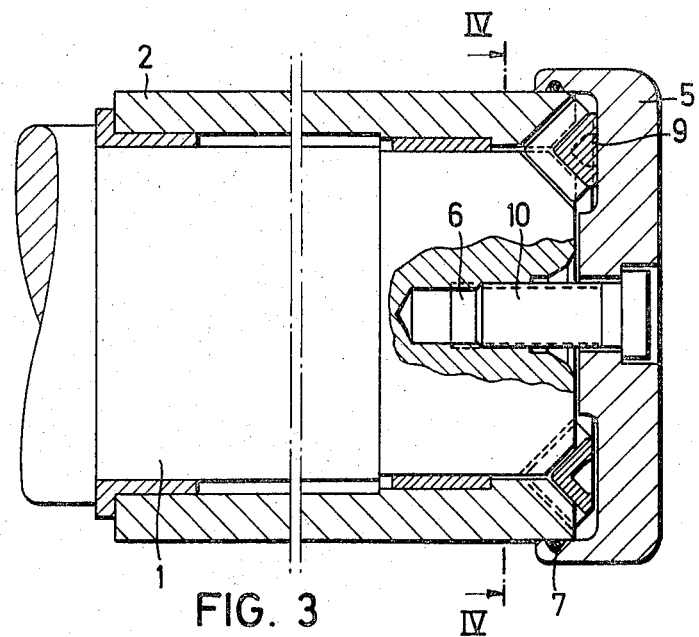
FIG. 3 is a longitudinal cross section of another embodiment of a coupling in accordance with the invention.

Referring now more particularly to the drawings, in FIG. 1 there is shown a shaft end 1 inserted into a hub or hollow shaft 2. The end faces both of the shaft end 1 and of the hub 2 are in a common plane. Slots 3 are cut into the end faces such that the wedge angle formed by the slots amounts to about 45°. The slots 3 in shaft end 1 and in hub 2 preferably form a crown, i.e. a circle. The positive coupling between shaft end 1 and hub 2 is provided by a coupling element 4 whose teeth are wedge-shaped to match the shape of the slots 3. The coupling element 4, (FIGS. 1 and 2), which is in the form of a continuous annular disk, is held in place after insertion into slots 3 by a cap 5. The cap 5 is fastened to shaft end 1 by means of the bolt 10 which is represented in FIG. 3, and which can be threaded into a tapped hole 6 in the shaft end 1. To seal the coupling element from the outside, the cap 5 is provided with a sealing ring 7 which resiliently engages the cylindrical outer surface of the hub 2 when the cap is fastened on.

Figure 4:
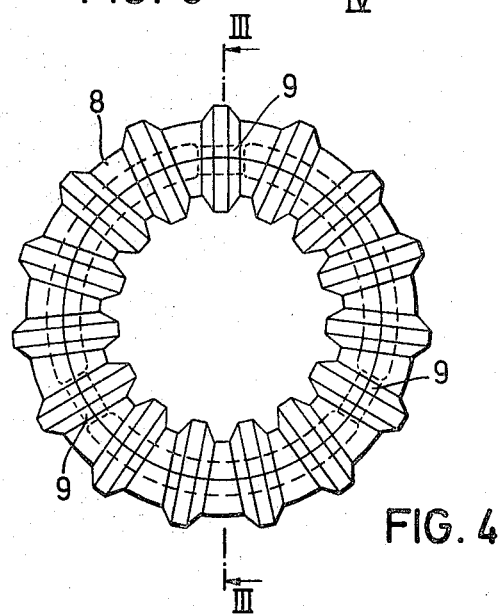
FIG. 4 is an elevational view of the annular coupling element of FIG. 2, taken along line IV—IV.

In another embodiment represented in FIGS. 3 and 4, a coupling element 8 is provided which engages the cap at only a few points of contact 9. The surface of the annular coupling element 8 which faces the cap 5 is advantageously provided with slight superelevations or projections between the points of contact, in the direction of the tips of the teeth. During the transfer of torque, the axial forces produced thus bring about a desired deformation of the coupling element, resulting in an improvement of the engagement of the coupling element 8 with the slots 3. The pliability of the coupling element is especially enhanced by the fact that the portions of the coupling element which are located between the individual teeth are also made deformable.

Both the slots 3 and the teeth of the coupling elements 4 and 8 have sloping flanks.

As employed herein, the hub may be of relatively short length or may be relatively longe, i.e. in essence a hollow shaft.

It will be appreciated that the instant specification and examples are set forth by way of illustration and not limitation, and that various modifications and changes may be made without departing from the spirit and scope of the present invention.

What is claimed is:

1. In a positive releasable coupling comprising a shaft, a hub on said shaft, the shaft and hub having end faces lying in substantially the same plane and being provided with aligned slots cut into their end faces, a coupling disk provided with teeth complementing and engaging the slots of said shaft and said hub and thereby coupling said shaft to said hub, and means for securing said disk to at least one of said shaft and said hub, the improvement which comprises forming said teeth so that they are generally radially directed, said teeth in radial cross-section being wedge-shaped, the apex of the wedge pointing toward said shaft and said hub and being located in the vicinity of the outside surface of said shaft.

2. A coupling according to claim 1, wherein the faces of said wedge-shaped teeth in radial cross-section making angles of about 45° with the plane in which the end faces of said shaft and said hub lie.

3. A coupling according to claim 1, said coupling disk being annular, said disk securing means comprising a cap positioned over said disk and means for securing said cap to at least one of said shaft and hub and thereby locking the teeth of said disk into engagement with the teeth of said shaft and said hub.

4. A coupling according to claim 3, wherein the portions of said disk between said teeth are deformable.

5. A coupling according to claim 3, wherein said cap or said disk on its face directed the other is provided with a plurality of projections which constitute the points of contact therebetween and by means of which said disk is forced into its operative position with its teeth coupling said shaft and said hub.

6. A coupling according to claim 5, wherein said projections are provided on said disk.

7. A coupling according to claim 1, wherein said teeth of said disk in cross-section tangential to said shaft are tapered toward said shaft.

8. A coupling according to claim 6, the faces of said wedge-shaped teeth in radial cross-section making angles of about 45° with the plane in which the end faces of said shaft and said hub lie, said teeth of said disk in cross-section tangential to said shaft are tapered toward said shaft, the portions of said disk between said teeth being deformable, and said cap being secured to said shaft by a bolt.

* * * * *